G. L. Jenks.
Weaving Heddle.

N° 14,061.  Patented Jan. 8, 1856.

UNITED STATES PATENT OFFICE.

GEO. L. JENKS, OF PROVIDENCE, RHODE ISLAND.

MACHINERY FOR MAKING WEAVERS' HARNESS.

Specification of Letters Patent No. 14,061, dated January 8, 1856.

*To all whom it may concern:*

Be it known that I, GEORGE L. JENKS, of the city and county of Providence and State of Rhode Island, have invented certain new and useful Improvements in Machines for Making Weavers' Harness; and I do hereby declare that the following is a full, clear, and exact description of the same, reference being had to the accompanying drawings, forming part of this specification, in which—

Figure 1:
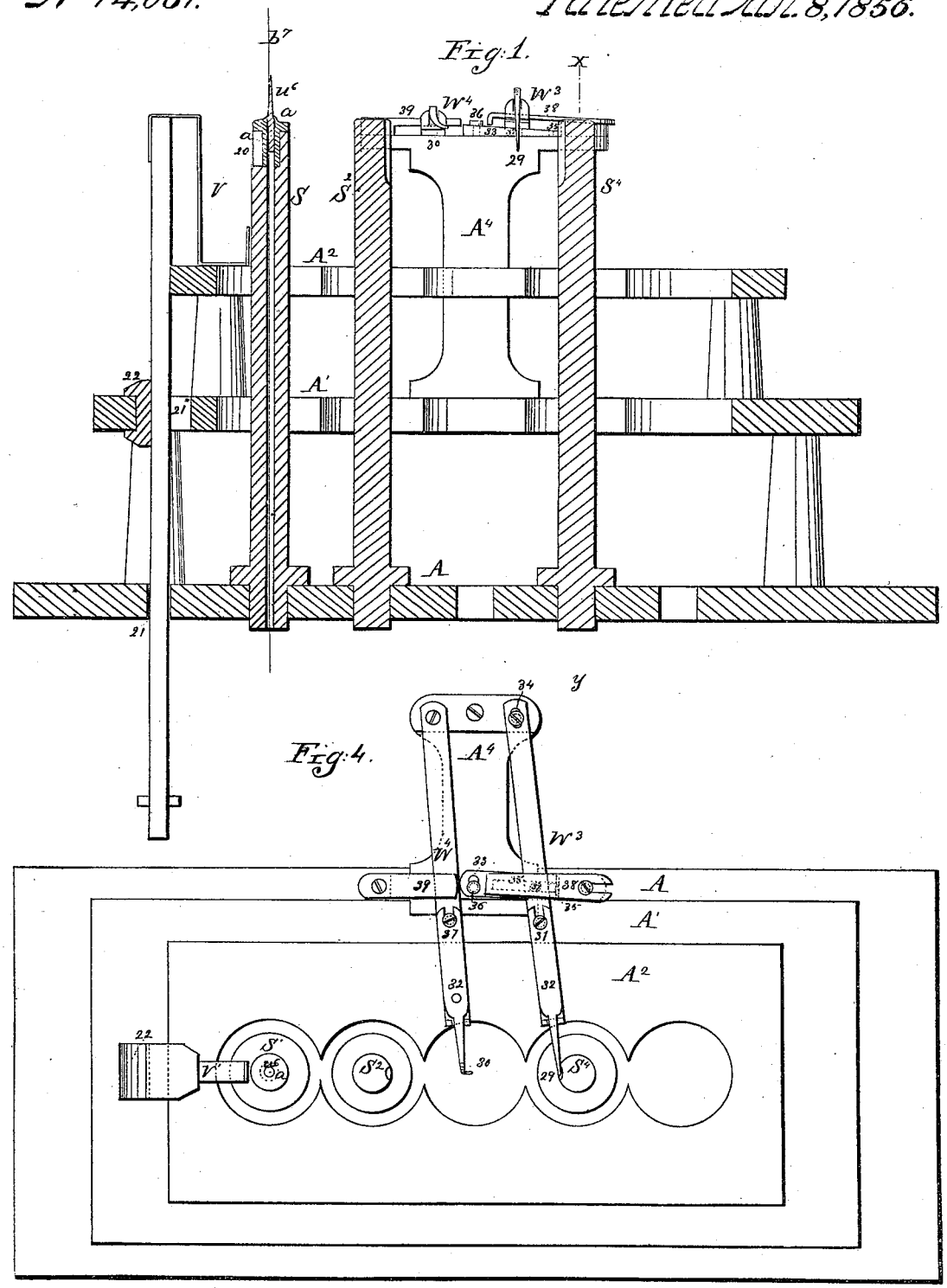
Figure 2:
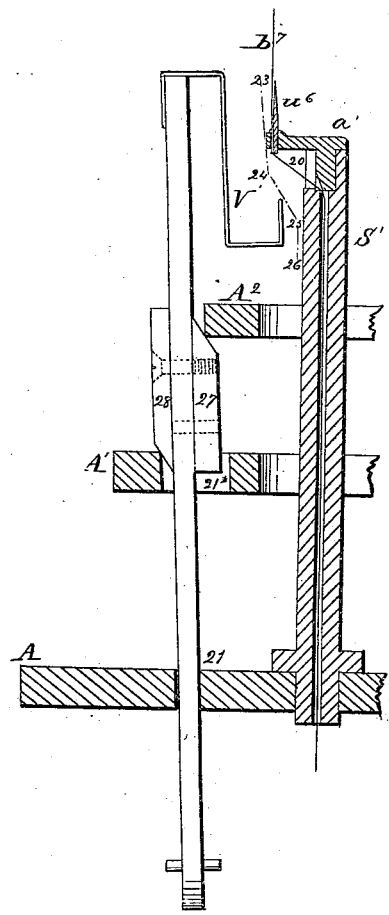
Figure 3:
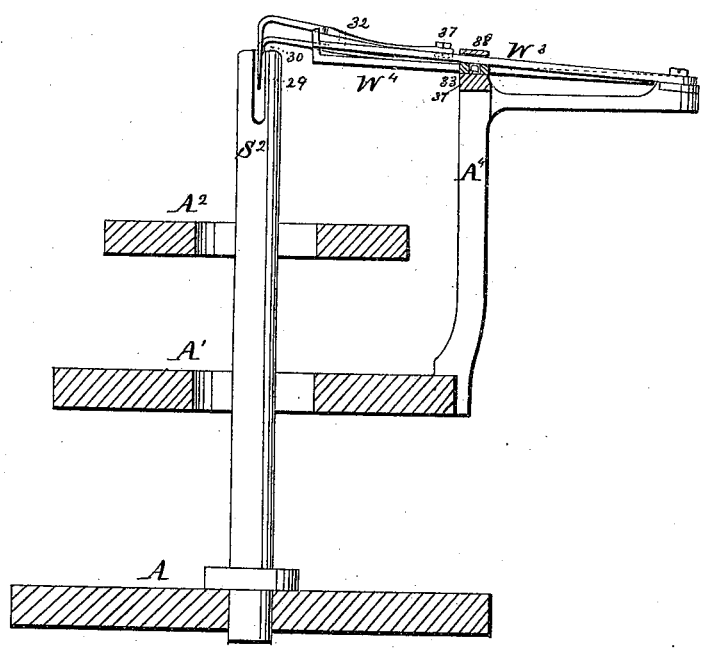
Figure 5:

Figure 1, is a vertical section of a portion of the machine in a plane passing through, the centers of all the studs. Fig. 2, is a section of a smaller portion of the machine in the same plane as Fig. 1, showing the adjustment of the machine for a different width of harness. Fig. 3, is a transverse vertical section in the line $x$, $y$, of Fig. 1. Fig. 4, is a plan of as much of the machine as shown in Fig. 1, and Fig. 5, a plan of an arm which is shown in Fig. 2, and is applied to the end studs to increase the width of the harness.

Similar letters of reference indicate corresponding parts in the several figures.

This invention consists in certain improvements in a machine for which Letters Patent of the United States were granted to Joseph S. Winser, on the 2nd of January, 1855. The objects of these improvements are, firstly, to adapt a single machine to the making of different widths of harness; secondly, to adjust the operation of certain parts of the machine which are employed to produce the knots to form the eye of the harness.

To enable those skilled in the art to make and use my invention, I will proceed to describe its construction and operation.

In the accompanying drawings only such parts of the machine are represented as are necessary to explain the improvements, and the description will be limited as much as possible to those parts. All parts of a machine having these improvements which are not specifically described herein are supposed to be substantially the same as described in the specification of Joseph S. Winser.

A, A', A², are three horizontal plates forming part of framing of the machine.

S', is one of the two hollow vertical studs through which pass the twines which are to form the bands of the harness. The corresponding stud is not represented as both are alike. These differ mainly from the same studs in Winser's machine in being fitted with loose head pieces $a$, $a'$, of which there may be two three or more for each stud, the said head pieces carrying the stems $u^6$, upon which are formed the knots by which the heddles are connected to the bands of the harness. One head piece $a$, of each stud, shown in Figs. 1, and 2, consists simply of a concentric piece turned with a shank fitted or screwed tightly into a cavity formed in the top of the stud and has the stem $u^6$, in the center and a hole through it for one of the bands $b^7$, which is indicated by a red outline in Fig. 1, to pass through. When the head piece $a$, is applied to each stud the studs are practically like the studs of Winser's machine, and the machine is adapted for the narrowest harness. The other head pieces $a'$, one of which is shown in Figs. 2, and 5, consist each of an arm having a shank to fit or screw tightly into the top of the stud and having the stem $u^6$, near the end of the arm. When these head pieces are applied to the studs the bands $b^7$, come up through their respective studs nearly to the top and then pass out each through a slot 20, made for that purpose in the side of its stud and through a small hole in the end of the arm and up alongside the outer side of the stem $u^6$, as is indicated by the red line representing the band $b^7$, in Fig. 2. These head pieces $a'$, by increasing the distance between the two stems $u^6$, and between the two bands $b^7$, increase the length of the heddle. The machine being provided with two pairs of head pieces $a'$, having arms of different lengths in addition to the pair $a$, may be varied to suit three widths of harness, and by providing it with an additional pair $a'$, of another length, it will be adapted for four widths.

The movements of what are termed the single depressors one of which V', is shown in Figs. 1, and 2, require to be varied to suit the different head pieces. This variation of movement is effected in the following manner. When the pair of head pieces $a$, is employed these depressors have a vertical movement the same as in Winser's machine the vertical bar to which either one is attached being at that time guided by working in holes 21, 21*, in the plates A, A, and also against the edge of the plate A². The hole 21, is much larger lengthwise of the machine as shown in Figs. 1, and 2, than the bar of the depressor, and a stationary packing piece 22, shown in Fig. 1, is fitted therein to keep the bar upright and in proper position. When a pair of head pieces $a'$, is employed, it is necessary, in order that the points of the stems at their inner ends may pass the outer ends of the head pieces that the depressors should have a movement somewhat resembling that indicated by the dotted line 23, 24, 25, 26, in Fig. 2. To produce this movement, the packing piece 22, is taken from the hole 21*, in the plate $A'$, and two flat blocks of metal 27, 28, are secured one to the inner and the other to the outer side of the depressor bar, as shown in Fig. 2. These blocks, when the bar is vertical as it is during the lower portion of the movement of the depressor, nearly or quite fill the hole 21*, or at any rate the block 28, must be in contact with the outer side of the hole. During the upper part of the movement of the depressor the part of the bar below the block 28, works against the outer side of the hole 21*, and the block 27, works against the edge of the plate A, and during such movement the point of the stem of the depressor describes that part of the dotted line 23, 24, but when in the descent of the depressor the beveled upper part of the block 27, comes in contact with the plate $A^2$, and the beveled lower part of the block 28, at the same time comes in contact with the outer side of the hole 21*, thus making the point of the depressor stem describe that part of the dotted line 24, 25, until the beveled parts of the blocks 27, 28, pass the plates $A^2$, $A'$, and the part of the depressor bar above the block 27, comes in contact with the plate $A^2$, and the straight outer side of the block 28, with the plate $A'$, and the bar becomes vertical the point during the remainder of its movement describing that part of the dotted line 25, 26. During the ascent of the depressor the same line is described. To suit different head pieces $a'$, the depressor bars will require different blocks 27, 28, as it is desirable that the stem of the depressor work as near as practicable to the head piece.

The above movement of the depressors is obtained without any change in the mechanism connected with their bars for giving motion to them, and without any change in the movement of the spool stands and carriages or any other part of the machine, and this mode of making the machine variable for different widths of harness is applicable at small expense to any machine already in use.

Having now described the nature and operation of that improvement by which one machine is adapted for harness of several widths, I will proceed to describe the other improvement which relates to the arrangement and adjustment of the fingers and adjustment of the hooks which are employed in forming the eyes of the harness. To illustrate this. One of these fingers 29, and the moving arm $W^3$, to which it is attached, and one of the hooks 30, and the arm $W^4$, to which it is attached are shown in the drawings. These fingers and hooks instead of forming parts of the arms as in Winser's machine are made separate and secured to their respective arms each by a screw 31. They are made elastic and are adjusted to elevate or depress their points by means of small screws 32, screwing through them and bearing on the top of their respective arms. The elastic portions of the fingers and hooks are kept from moving laterally independently of the arms by fitting in forks which are turned up at the ends of the arms. The arms to which the hooks are attached swing each from a fulcrum pin at its rear end like those in Winser's machine, but the arms to which the fingers are attached are differently arranged and applied so that the fingers may move in straight lines but that the lines of their movements to and from their respective studs $S^2$, $S^4$, may be slightly varied, but that still they will always arrive at the same position when they come in contact with the studs. Instead of moving in arcs, the fingers move in straight lines, each of their arms though swinging from a fixed fulcrum pin at its rear end, being guided by a pin 37, attached to its under side, working in a straight slot in a plate 33, see Figs. 1, 3, and 4, which is secured to a stand $A^4$, forming part of the framing of the machine, the hole 34, which receives the fulcrum pin being slotted to admit of this straight movement. The position of that end of the plate 33, which is nearest the stud $S^2$, or $S^4$, in connection with which the finger operates, (the finger shown in the drawing operates in connection with $S^4$,) is fixed being maintained by a fixed stud 35, shown dotted in Fig. 4, which receives the end of the slot in which the pin 37, works, but the other end of the plate which is secured by a screw 36, is made movable by being provided with a slot for the screw to pass through. This adjustment of the plate allows the movement of the finger to be so perfectly directed and controlled that it will pass the hook on the opposite side of the machine in connection with which it works to produce the loop and form the knot, and will leave the proper space between them in passing, for the twine; and it allows the line of movement to be so varied as to accommodate different thicknesses of twine. The above movement brings the fingers both out of the line of studs which prevents the thread when knocked off them from getting under them and being prevented from rising. The upper surface of the plate 33, is an inclined plane which is shown in Fig. 1, the inclination being in such direction as to cause the point of the finger to rise as it moves away from its respective stud. The arms W³, are prevented rising by a plate 38, which is placed above it and a plate 39, is secured to the stand A⁴, for the purpose of keeping down the arm W⁴.

The above described method of arranging and directing the operation of the fingers and hooks affords great convenience.

What I claim as my invention and desire to secure by Letters Patent, is—

1. The within described method of adapting the machine to the making of harness of different widths by the application of movable head pieces $a$, $a'$, of different forms to the studs S⁷, and its fellow which form the end or outside studs of the range, and the application to the single depressors of a movable packing piece 22, and blocks 27, 28, or other variable guides, the whole operating substantially as herein described.

2. Guiding the operations of the arms which carry the fingers employed in forming the loops and knots to produce the eyes of the heddles by means of a pin 37, working in a slot in a plate 33, which is made variable by swinging on a stud 35, whereby the movement of the finger may be varied to any extent necessary without varying its position when in contact with its respective stud S², or S⁴, substantially as herein described.

GEO. L. JENKS.

Witnesses:
J. B. KIMBALL,
H. S. BARTLETT.